United States Patent
Bauer et al.

(10) Patent No.: US 9,924,832 B2
(45) Date of Patent: Mar. 27, 2018

(54) HEATING SYSTEM FOR HEATING A FOOD PRODUCT

(71) Applicant: PRINCE CASTLE LLC, Carol Stream, IL (US)

(72) Inventors: Richard Bauer, Palatine, IL (US); Karl Ronald Heinze, Chicago, IL (US)

(73) Assignee: PRINCE CASTLE LLC, Carol Stream, IL (US)

( * ) Notice: Subject to any disclaimer, the term of this patent is extended or adjusted under 35 U.S.C. 154(b) by 38 days.

(21) Appl. No.: 14/745,347

(22) Filed: Jun. 19, 2015

(65) Prior Publication Data

US 2016/0367078 A1    Dec. 22, 2016

(51) Int. Cl.
*A47J 37/08* (2006.01)
*A47J 37/00* (2006.01)
*A47J 37/04* (2006.01)

(52) U.S. Cl.
CPC .......... *A47J 37/0857* (2013.01); *A47J 37/044* (2013.01)

(58) Field of Classification Search
CPC .................................. A47J 37/00; A47J 37/08
USPC .......... 99/372–377, 386–391, 400–401, 423, 99/427, 443 R, 443 C, 446–450, 477–479; 219/388, 400, 521
See application file for complete search history.

(56) References Cited

U.S. PATENT DOCUMENTS

| | | | |
|---|---|---|---|
| 4,273,236 A | 6/1981 | Wahl et al. | |
| 5,473,975 A | 12/1995 | Bruno et al. | |
| 5,746,116 A | 5/1998 | Smith | |
| 5,802,959 A * | 9/1998 | Benson | A47J 37/044 126/21 A |
| 5,816,138 A * | 10/1998 | Benson | A47J 37/044 99/355 |
| 6,204,482 B1 * | 3/2001 | Smith | A47J 37/08 219/388 |
| 6,595,117 B1 | 7/2003 | Jones et al. | |
| 7,800,023 B2 | 9/2010 | Burtea et al. | |
| 8,895,096 B2 * | 11/2014 | Green | A21B 1/245 426/523 |
| 2004/0208961 A1 | 10/2004 | Reckert et al. | |
| 2007/0194000 A1 * | 8/2007 | Baumeister | A21C 9/08 219/388 |
| 2010/0275789 A1 | 11/2010 | Lee et al. | |
| 2011/0059211 A1 * | 3/2011 | Chandi | A21D 8/06 426/243 |
| 2014/0037828 A1 * | 2/2014 | Kot | A47J 37/045 426/637 |

\* cited by examiner

*Primary Examiner* — Michael Laflame, Jr.
(74) *Attorney, Agent, or Firm* — Marshall, Gerstein & Borun LLP (57) ABSTRACT

A heating system for heating a food product includes a housing including at least one heating cavity, a conveyor belt system which is configured to move the food product from a first end of the heating cavity to a second end thereof, a heating unit disposed generally parallel to a top surface of the conveyor belt system, and an in-feed rack having a first and second portion. The first portion of the in-feed rack may be positioned proximal to the conveyor belt system, and the second portion is positioned distal to the conveyor belt system. Each of the first and second portions of the in-feed rack has a generally planar cross section. A longitudinal length of the first portion of the in-feed rack is offset a substantially vertical distance from a longitudinal length of the second portion of the in-feed rack.

14 Claims, 9 Drawing Sheets

HEATING SYSTEM FOR HEATING A FOOD PRODUCT

TECHNICAL FIELD

The present application generally relates to feeding food products into a heating system, and, more particularly, to an offset in-feed rack for use in combination with a heating system for heating a food product.

BACKGROUND

Food product heating devices such as toasters are generally known in the industry. These toasters may be used to heat a variety of products such as bread, rolls, muffins, biscuits, bagels, and other similar food products. In some commercial toasters used in high volume environments, a conveyor belt system may move the food product through a length of the device to apply heat to the food product in a desired manner. These toasters, commonly called conveyor toasters, may be configured in a number of orientations such as, for example, a generally vertical orientation whereby the food product moves from an upper portion of the device to a lower portion of the device to be heated. U.S. Pub. No. 2010/0275789 discloses a representative vertical food heating device. In other examples, the toaster may be configured in a generally horizontal orientation where the conveyor belt system moves the food product from one side of the toaster to the other side. U.S. Pat. No. 7,800,023 discloses a representative horizontal food heating device.

In horizontally-oriented conveyor belt heating systems, the food product is often fed onto the conveyor belt system by an angled in-feed rack. These racks are generally oriented downwardly and typically rely on gravitational forces to cause the food product to advance towards the conveyor belt system. Multiple food products may come into contact with each other during the in-feed process. For example, when a leading food product advances to the conveyor belt from the in-feed rack for a horizontally-oriented conveyor belt heating system, a subsequent or trailing food product may become wedged or caught under the leading food product due to a leading portion of the trailing food product contacting the conveyor belt before the trailing portion of the trailing food product contacts the conveyor belt. Such a configuration may produce a result commonly referred to as "shingling," where leading and trailing food items partially occupy the same space, i.e., the leading portion of a trailing food product and the trailing portion of a preceding or leading food product overlap. Shingling can occur with the trailing product being disposed either over or under the leading product. During the shingling process typically observed in conventional horizontally-oriented conveyor belt heating systems, a trailing food product contacts and undermines a portion of the leading food product such that the leading food product is unevenly toasted, and the trailing food product may also be unevenly toasted in addition to both products possibly being damaged or broken during conveyance travel. As a result of this shingling occurring, one or both of the food products may be unsuitable for consumption or sale, which may result in inefficient and/or costly food preparation.

SUMMARY

Generally speaking, the present disclosure is directed to a heating system for heating a food product having a housing including at least one heating cavity, a conveyor belt system which is configured to move the food product from a first end of the heating cavity to a second end thereof, a heating unit disposed generally parallel to a top surface of the conveyor belt system, and an in-feed rack having a first and second portion. The first portion of the in-feed rack is positioned proximal to the conveyor belt system, and the second portion is positioned distal to the conveyor belt system. Each of the first and second portions of the in-feed rack has a generally planar cross section. A longitudinal length of the first portion of the in-feed rack is offset a substantially vertical distance from a longitudinal length of the second portion of the in-feed rack, such that the first and second portions are arranged in an offset configuration, with a substantially vertical predetermined distance separating the first and second portions (with respect to how the first and second portions are oriented). In a preferred embodiment, as generally illustrated herein, the heating system for heating a food product is conveyor toaster for contact toasting a bread product.

In some embodiments, the conveyor belt system comprises a substantially horizontal portion and at least one angled portion. The angled portion may have a downwardly inclined angle relative to the substantially horizontal portion. This angled portion may be disposed proximal to the first portion of the in-feed rack, in a position that generally corresponds to the entrance of the conveyor belt system relative to the housing.

In many approaches, the heating unit comprises a heating platen configured to heat the food product via contact heating. Other examples of heating units, including but not limited to infra-red heating units, convective heating units, and inductive heating units, are possible.

In many examples, the in-feed rack is configured to facilitate movement of the food product from the second portion thereof to the first portion thereof prior to the food product contacting the conveyor belt system. Further, the in-feed rack may be configured to cause a portion other than a generally leading portion of the food product to contact the conveyor belt system first. As a result, a trailing food product contacts a leading food product at or above a top edge of the leading food product such that the trailing food product can pivot off of a leading food product to reduce the occurrence of the trailing food product undermining the leading food product.

The longitudinal length of the first portion is typically less than the length of a food product to be heated by the heating unit.

The first portion of the in-feed rack may be positioned a distance which is approximately the length of a food product away from the heating cavity (which begins at the proximal edge of the heating unit) and may be positioned substantially in contact with the conveyor belt/rack.

Further, the longitudinal length of the second portion may be of any dimension, and when a third portion is included as described herein, the longitudinal length of the second portion is typically less than the length of a food product to be heated by the heating unit.

The first portion and second portion of the in-feed rack may be configured in a substantially stepped pattern. The offset between the longitudinal lengths of the first and second portions of the in-feed rack may be defined by an offset axis, and typically has a height less than the thickness of a food product to be heated by the heating unit.

In some examples, the longitudinal lengths of the first and second portions of the in-feed rack are substantially parallel to each other. In other forms, the longitudinal lengths may be angled relative to each other such that they are on intersecting planes. The longitudinal lengths of the first and second portions may be separated by a predetermined vertical distance i.e., an offset as previously described. The offset distance of the in-feed rack may be adjustable so as to accommodate offsets of various lengths and thereby reduce the problem of shingling for different food products.

Generally, the offset between the longitudinal length of the first portion of the in-feed rack and the longitudinal length of the second portion of the in-feed rack is a sufficient length such that a trailing food product remains horizontally above or horizontally level with an upper surface of a leading food product. As such, the offset may be dimensioned to be less than the thickness of the food product being conveyed, or within about 30% and 70% of the thickness of the food product being conveyed.

In alternative embodiments, the in-feed rack is configured to cause a leading portion of the trailing food product to contact the leading food product at a contact point first during the in-feed process and pivot about the contact point until a trailing portion of the trailing food product contacts the first portion of the in-feed rack such that the trailing portion contacts the in-feed rack before the leading portion contacts the conveyor belt system.

BRIEF DESCRIPTION OF THE DRAWINGS

The problems described in the background section above are at least partially solved through provision of an offset plane in feed device as described in the summary section provided above and the following detailed description, particularly in conjunction with the following drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to the various embodiments disclosed herein, an offset plane in-feed rack is provided to reduce and/or eliminate the occurrence of shingling and other similar defects during heating of a food product. In one approach, the generally downward angle of the in-feed rack causes a first bun to slide down the rack and engage a conveyor belt. The bun then engages the heating unit and is heated and/or toasted.

In the illustrated embodiments, the offset plane in-feed is offset a distance that is less than the thickness of the leading food item (illustrated as a bun). The offset plane in-feed further causes a forward portion of a subsequent or trailing food product to at least partially rest on top of the first food product until a rearward portion of the trailing food product contacts a conveyor. The trailing food product may then advance along the conveyor in this position until contacting a throat portion, which is the beginning of the heating cavity (i.e., where the food item is first exposed to heat), at which time the trailing food product may safely slide onto the conveyor.

So configured the possibility of food products being stuck, damaged, and/or destroyed during heating is greatly reduced. In particular, when a food heating device is combined with an in-feed rack according to the instant disclosure, the trailing food item or bun will always remain at the same level or vertically above the top of the leading food item or bun during the in-feed process into the heating cavity and be positioned at the same level upon entry into the heating cavity. As a result, more food items or buns are properly heated and less are discarded due to damage.

Figure 9:
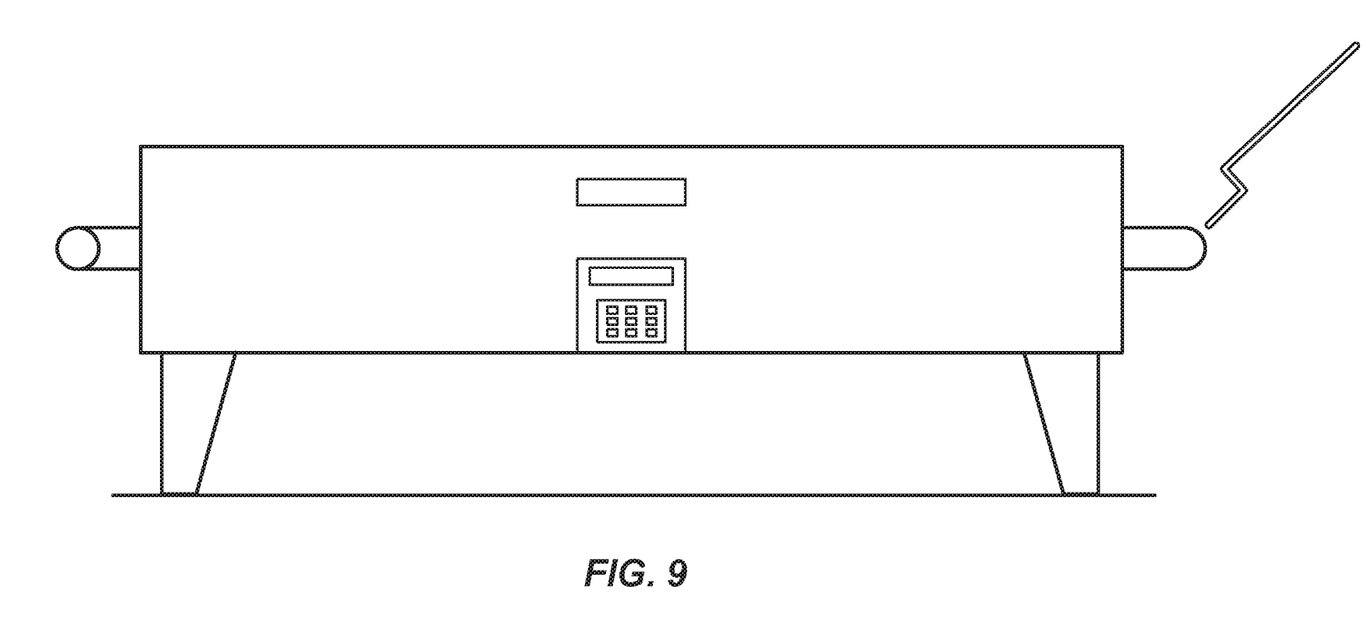
FIG. 9 comprises a side elevation view of a conventional horizontal food heating device in accordance with various embodiments of the invention.

Turning briefly to FIG. 9, a typical horizontal food heating device is provided and is defined by a housing within which is a heating cavity. U.S. Pat. No. 7,800,023 discloses a representative horizontal food heating device, the contents of which are herein incorporated by reference in its entirety. The housing has a top, a bottom, a first opening on one side and a second opening on the opposing side, the first and second openings providing access to and egress from the heating cavity. The cavity encloses heaters that direct heat towards a conveyor belt system which carries food from the first opening to the second opening. The heating unit can be an infrared heating unit, a convective heating unit, an inductive heating unit, for example. Preferably, the heating unit is a heating platen configured to heat the food product via contact heating.

As is known in the art, the device may also include a keypad and a controller having any number of display units which allow an operator to enter commands to effectuate cooking control. For example, cooking control may be achieved by adjusting the speed of a motor driving the conveyor belt system and/or by controlling the heat provided by the heater units(s) within the cavity. The device may also include any number of viewing windows to allow the operator to continuously and safely observe the cooking process.

Figure 1:
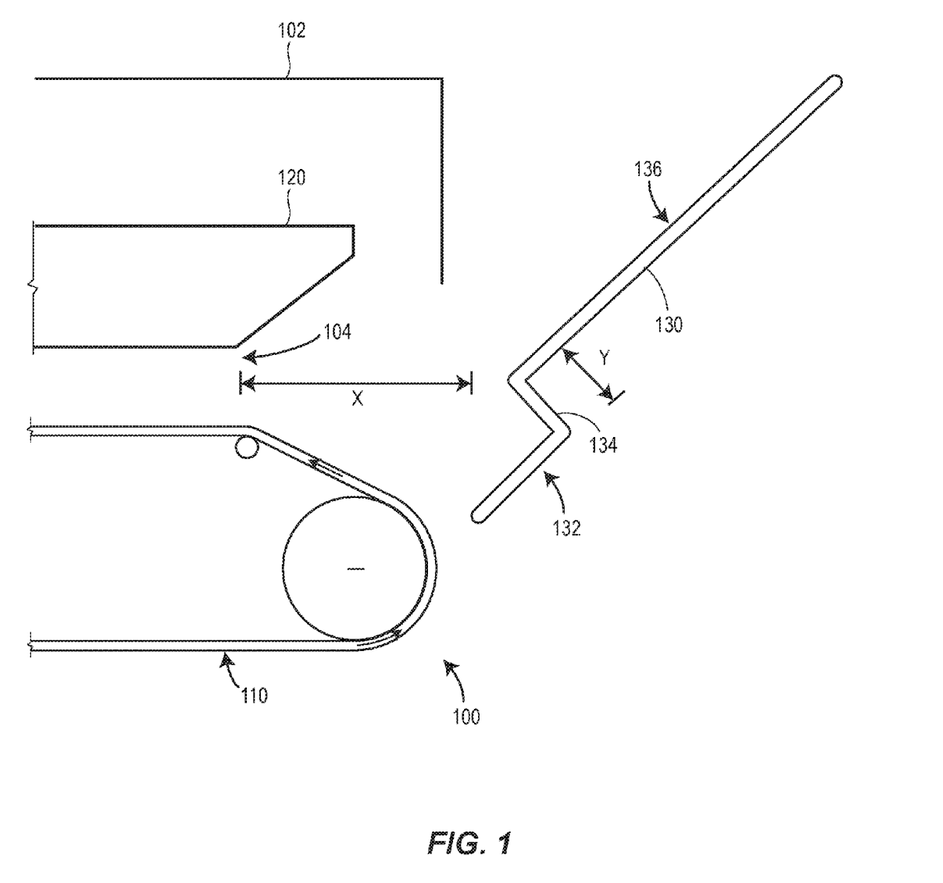
FIG. 1 comprises a side elevation view of an example offset plane in feed as configured in accordance with the present disclosure.

Referring now to FIG. 1, an exemplary heating device 100 is provided which may include a housing 102 having a heating cavity 104, a conveyor belt system 110, a heating unit 120, and an in-feed rack 130.

The housing 102 may be any number of shapes, sizes, and/or orientations, and serves the purpose of enclosing many of the other components to provide protection, ventilation, and/or insulation, among other benefits. The housing 102 may be constructed from a number of materials, for example, a sheet metal material such as stainless steel. The housing 102 may also contain a number of controls and may serve to assist in operating the heating device 100. As previously stated, the housing 102 may be oriented to allow food products to traverse the device 100 in a generally horizontal configuration, a generally vertical configuration, or any other angles or configurations.

The conveyor belt system 110 may be any type of conveyor belt system known and used in conjunction with heating devices and accordingly will not be discussed in substantial detail. For example, the conveyor belt system 110 may include a number of wheels, sprockets, bearings, and/or gears to guide a conveyor belt (or, in some examples, spaced metal rods) and cause the belt to move into the heating cavity 104. The conveyor belt itself may be made of any number of heat-resistant materials and/or coatings such as metals, polymers, and the like. In some embodiments, the conveyor belt system 110 may be adjusted according to varying sizes of food product as is known in the art. For example, in one embodiment, the conveyor belt system 110 may be adjusted with respect to the heating unit 120. In another embodiment, the heating unit 120 may be adjusted with respect to conveyor belt system 110.

The heating unit 120 may be any type of system designed to heat a food product, and may be disposed generally parallel to a top surface of the conveyor belt system 110. In some forms, the heating unit 120 may include a contact heating platen which is configured to heat the desired food product through direct or near contact therewith. Other examples of heating units, including infra-red heating units, convective heating units, and inductive heating units, are possible.

In some examples, one or both of the conveyor belt system 110 and the heating unit 120 may include a substantially horizontal portion and an angled or tapered portion. This tapered portion may facilitate receiving food product from the in-feed rack 130.

The in-feed rack 130 includes a first portion 132 having a longitudinal length positioned proximal to the conveyor belt system 110, a second portion 136 having a longitudinal length positioned distal to the conveyor belt system 110, and an offset 134 positioned between the first and second portions 132, 136. The first portion 132 may be positioned or disposed from the heating cavity 104 a distance (denoted by "x") approximately equal to the length of a food product being heated to facilitate a generally horizontal orientation of the food product. For example, depending on the food product, the distance x may be approximately between one to six inches in length.

Generally, the longitudinal length of the first portion 132 is significant for reducing the problem of shingling; in this respect, first portion longitudinal lengths less than the length of the food product to be heated by the heating unit 100 are preferred. For example, the longitudinal length of the first portion 132 may be between approximately 0.5 and approximately five inches and typically is between about one and about four inches in length. Alternatively, the longitudinal length of the first portion 132 may be between 10% and 80% and/or between 20% and 60% of the length of the food product being conveyed. Other examples are possible.

Figure 8:
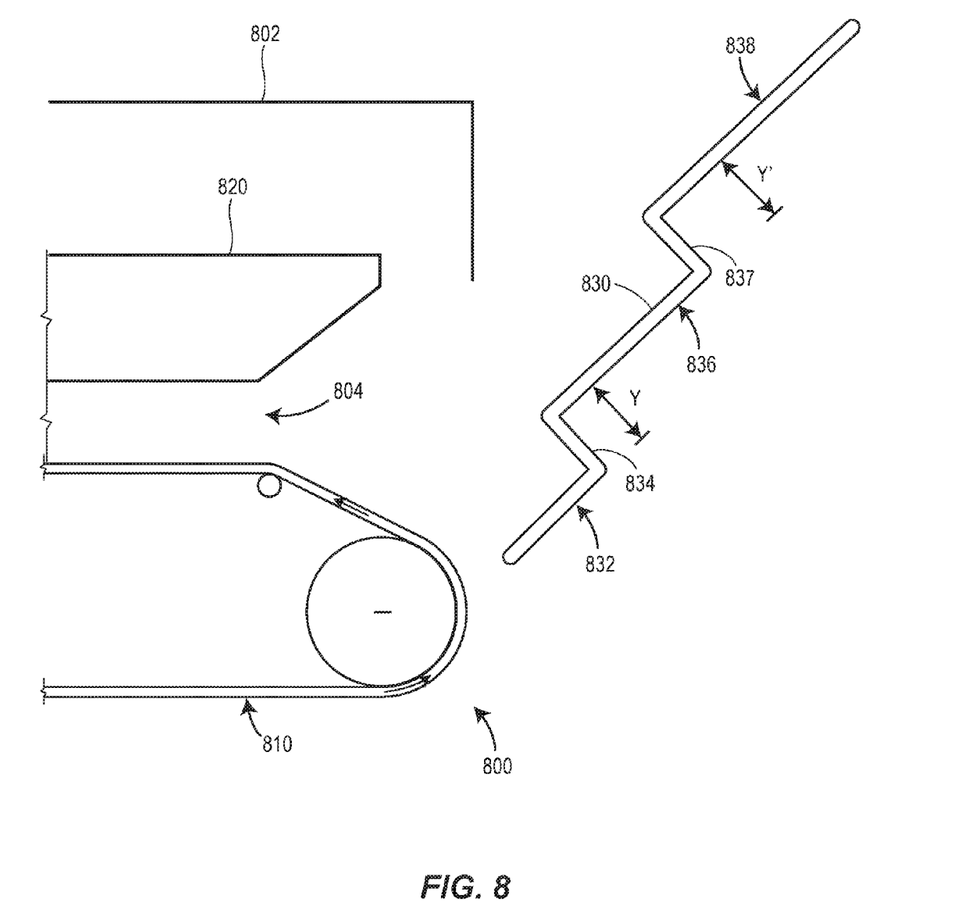
FIG. 8 comprises a side elevation view of an alternate offset plain feed having dual-offsets as configured in accordance with the present disclosure.

When a third portion 838 is included, as described in further detail below, the length of the second portion 836 is typically less than the length of the food product to be heated by the heating unit 100. For example, the longitudinal length of the second portion 836 may be between approximately 0.5 and approximately five inches and preferably between approximately one and approximately four inches in length. Alternatively, the longitudinal length of the second portion 836 may be between about 40% and 95% and/or between 60% and 90% of the length of the food product being conveyed. Other examples are possible.

The in-feed rack 130 may be constructed of any number of materials such as, for example, metals, inorganic materials such as ceramics, plastics and/or polymers, and rubbers, to name a few. Other examples are possible. The in-feed rack 130 may have a generally flat surface for supporting a food product or may alternatively have a non-flat supporting surface. For example, the support surface may include a number of ridges, bumps, rollers, grooves, and the like. Other examples are possible.

The in-feed rack 130 may be coupled to the heating device 100 by any number of methods, for example, the use of brackets, hinges, fasteners, and the like. Other commonly known coupling devices are possible. The in-feed rack 130 is positioned at an angle relative to the generally horizontal conveyor belt system 110 and the heating unit 120.

In many approaches, both the first portion 132 and the second portion 136 have a generally planar cross section. However, it is understood that in some forms, one or both of the first and second portions 132, 136 may have a generally non-planar cross section. In many embodiments and as illustrated in FIG. 1, the longitudinal length of the first portion 132 and the longitudinal length of the second portion 136 are substantially parallel. By "substantially parallel" and as used herein, it is meant longitudinal lengths which are within 10° of (entirely) parallel. In other embodiments, the longitudinal lengths of the first and the second portions 132, 136 are on intersecting planes; for example, they are angled relative to the other at angles that are greater than 10°.

As indicated in FIG. 1, the offset 134 causes a longitudinal length of the first portion 132 to be offset a distance (denoted by "y") from a longitudinal length of the second portion 136 of the in-feed rack 130. In some embodiments, this offset or offset axis 134 may be a substantially vertical distance relative to the first and second portions 132, 136 of the in-feed rack 130. So configured, the first portion and the second portion 132, 136 of the in-feed rack 130 are provided in a stepped pattern. It is understood that the term "stepped" includes configuration in which an offset 134 between two planes or two portions 132, 136 occurs. Accordingly, in some examples, the offset 134 may be configured approximately perpendicular to the first and second portions 132, 136, and in other examples, the offset 134 may be provided in any number of angles or configurations relative to the first and the second portions 132, 136 such as at approximately 45° from a generally planar cross section of the first and/or second portions 132, 136. The offset 134 may form an acute angle, a right angle, or an obtuse angle with either the first and/or the second portions 132, 136. Typically, the offset 134 is provided at an angle that is approximately perpendicular to the first and second portions, for example, within 10° of a right angle. Other examples of configurations of the offset 134 are possible.

In many embodiments, the offset 134 typically has a height less than the thickness of a food product to be heated by the heating unit. Heights greater than the thickness of the food product to be heated can detrimentally cause undesirable overlap of more than two food items. Generally, the offset 134 may be a sufficient length such that a subsequent or trailing food product remains vertically above or level with an upper surface of the leading food product as discussed below with reference to FIGS. 2-7. For example, the height of the offset 134 may generally be between approximately 0.1 and 4.5 inches in length. Alternatively, the height of the offset 134 may be between about 20% and 80% and/or between about 30% and 70% of the thickness of the food product being conveyed.

In accordance with some embodiments, the in-feed rack 130 may be adjustable to accommodate varying sizes of food product using any number of known approaches. For example, the first and second portions 132, 136 may utilize a sliding locking mechanism to slidably increase and/or decrease the height of the offset 134. So configured, the height of the offset 134 may be adjusted as desired. Similarly, the length of the first portion may be adjustable to accommodate varying sizes of food product using any number of known approaches. For example, the first portion 132 may utilize a sliding locking mechanism to slidably increase and/or decrease the length of the first portion 132. So configured, the first portion 132 may be adjusted as desired. When a third portion 838 is included, as described in further detail below, the length of the second portion 836 may also be adjustable.

Figure 2:
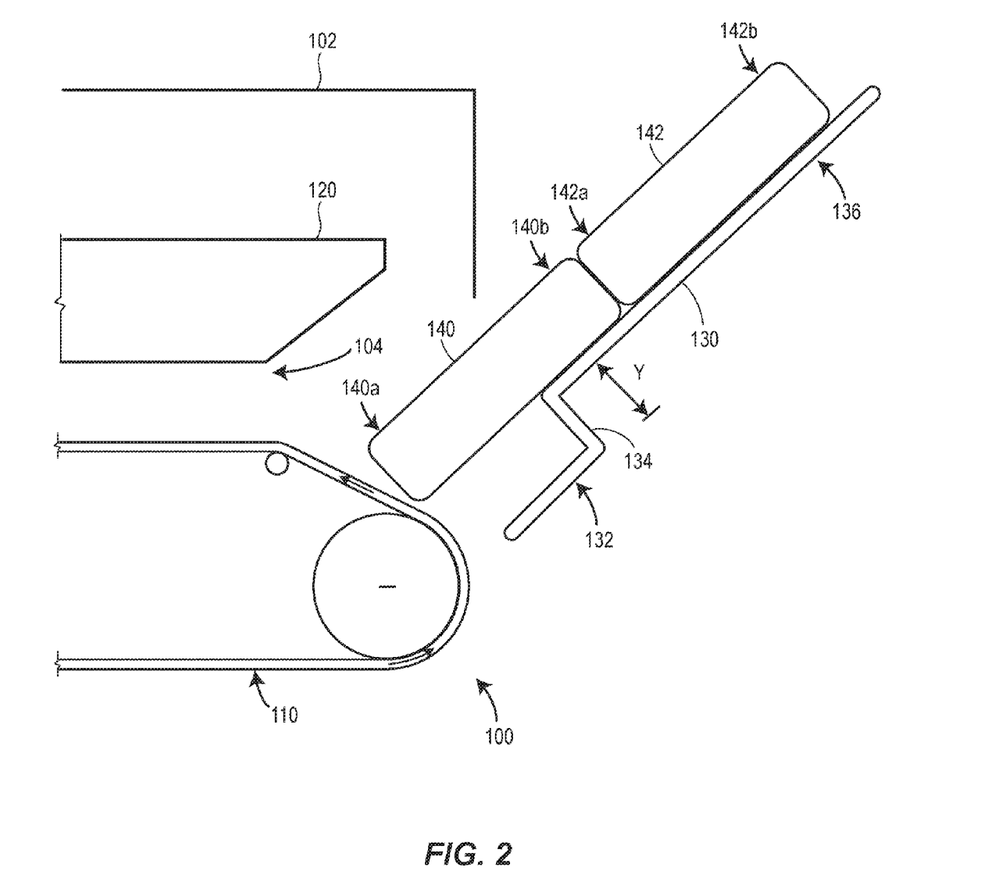
FIGS. 2-7 comprise side elevation views of the example offset plane in feed device of FIG. 1 having a leading and trailing food product progressing through a heating cavity as configured in accordance with the present disclosure.

In operation, and with reference to FIGS. 2-7, the in-feed rack 130 is configured to facilitate movement of a first food product 140 and a second food product 142 from the second portion 136 of the in-feed rack 130 to the first portion 132 of the in-feed rack 130, such that shingling is ultimately reduced when the food products are heated in the heating cavity 104. With reference to FIG. 2, the food products 140, 142 traverse the in-feed rack 130 in a generally downward direction. Each of the food products may include a "cut" edge or surface, or a surface in which the food product is cut along to obtain a desired thickness. In many embodiments, this cut surface is the upward-facing surface relative to the conveyor belt system 110. It is understood, however, that the cut surface may be facing downwards relative to the conveyor belt system 110.

As illustrated in FIG. 2, a leading portion 140a of the first food product 140 contacts the conveyor system 110 and begins to advance towards the heating cavity 104 to be heated by the heating unit 102.

Figure 3:
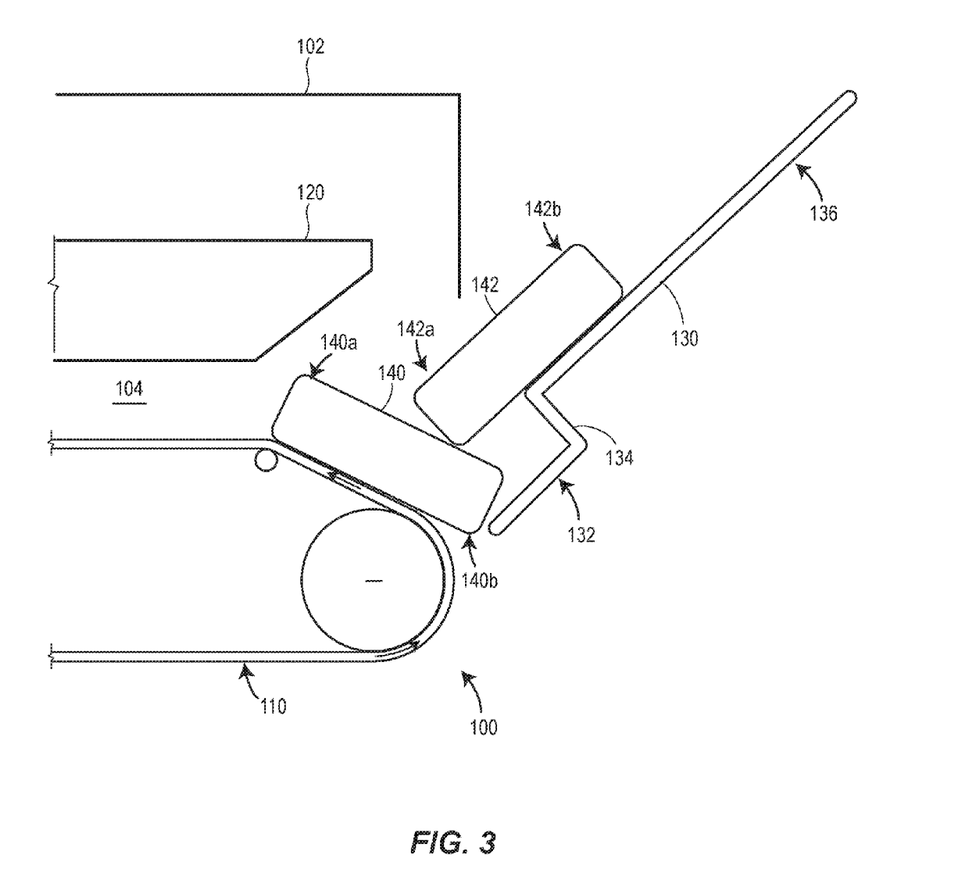

As shown in FIG. 3, upon the first food product 140 beginning to advance within the heating cavity 104, gravitational forces cause a trailing portion 140b of the first food product 140 to drop down onto the first portion 132 of the in-feed rack 130 and further advance towards the heating cavity. Because of the offset 134 provided by the in-feed rack 130, a leading portion 142a of a subsequent trailing second food product 142 rests on the upper, cut surface of the trailing portion 140b of the first food product 140. This the upper, cut surface of the trailing portion 140b of the first food product 140 acts as a contact point or pivot point for the second food product 142 to be supported by and rotate about. During advancement of the food products, the cut surface of the second food product 142 remains above the cut surface of the first food product 140.

Figure 4:
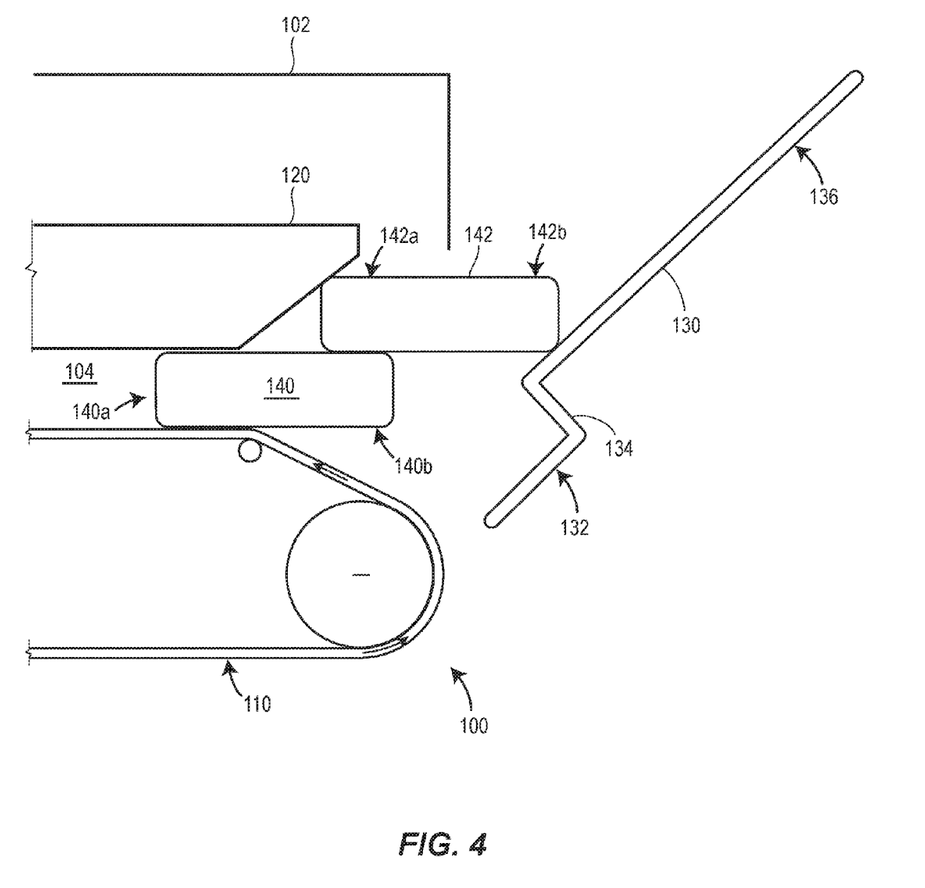

Turning to FIG. 4, as the first food product 140 continues to advance in the heating cavity 104, the trailing portion 142b of the second food product 142 continues to be supported by the second portion 136 of the in-feed rack 130. So configured, a portion of the second food product 142 remains above or level with an upper surface of the trailing portion 140b of the first food product, thus eliminating the possibility of the second food product 142 from being wedged below the first food product 140 so as to cause shingling. Although not specifically illustrated, the portion of the second food product 142 may pivot off of a side surface of the first food product 140, rather than the upper, cut surface of the first food product 140 as generally illustrated.

Figure 5:
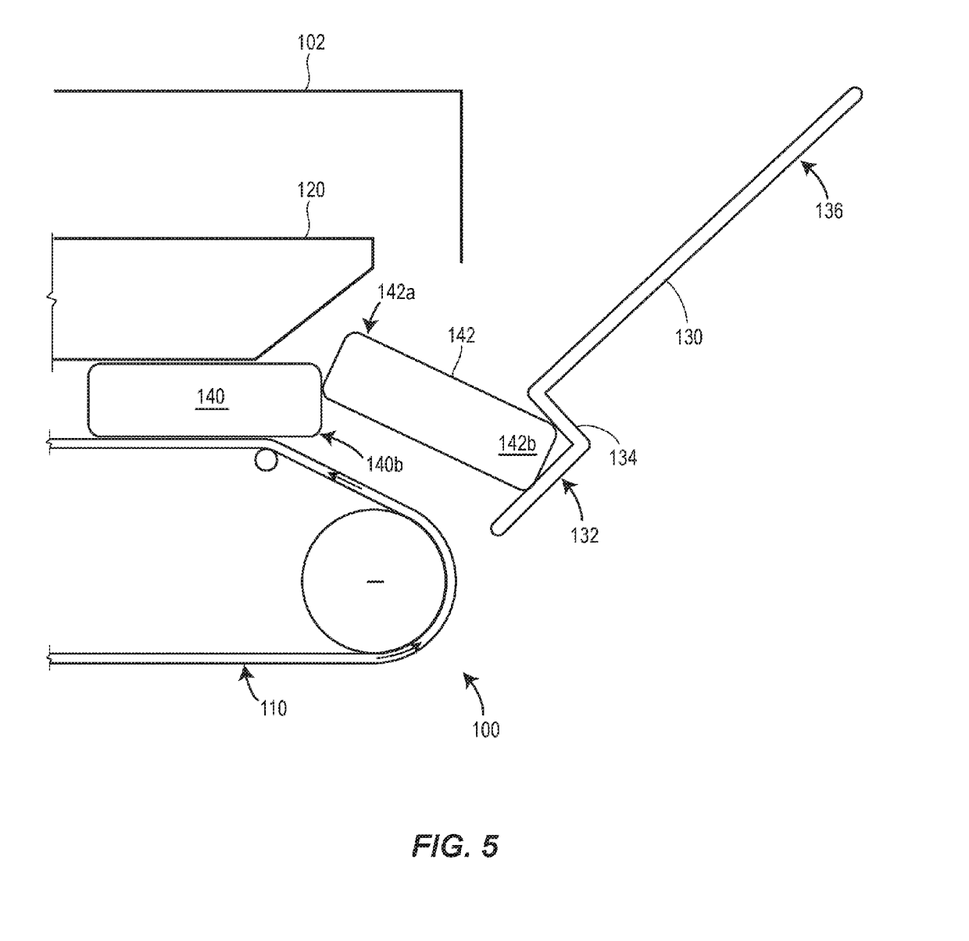

As illustrated in FIGS. 4 and 5, the trailing portion 142b of the second food 142 product drops from the second portion 136 of the in-feed rack to the first portion 132 via the offset 134. As a result, the leading portion 142a of the second food product 142 is generally positioned above such that it can contact and pivot about the trailing portion 140b of the first food product 140. In some embodiments, contact between the trailing portion 142b of the second food product 142 and the first portion 132 of the in-feed rack 130 occurs prior to the leading portion 142b contacting the conveyor belt system 110. But, the heater 120, or the angled portion thereof, may also contact the leading portion 142a of the second food product 142 when the second food product 142 is overlapping the first food product 140 such that the second food product is properly oriented for conveyance travel into the heating cavity 104, without any shingling. Generally, the leading portion 142a of the second food product 142 remains above and supported by the trailing portion 140b of the first food product 140 until entry into the heating cavity 104.

Figure 6:
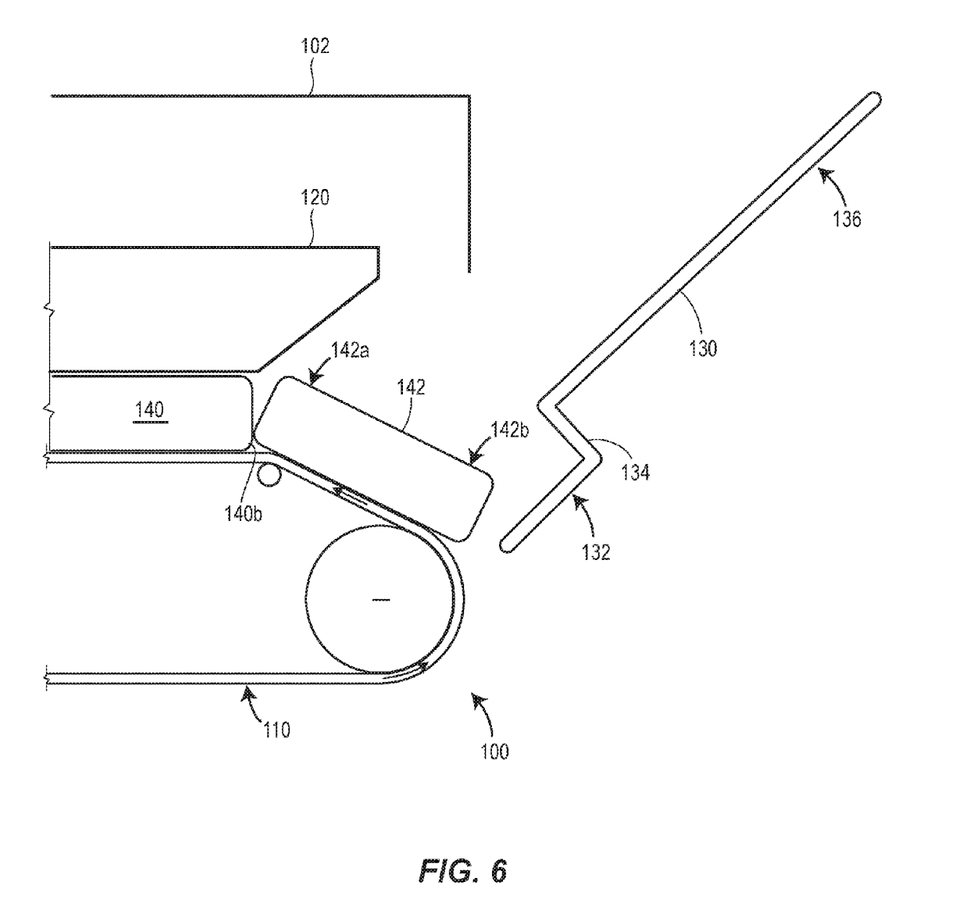
Figure 7:
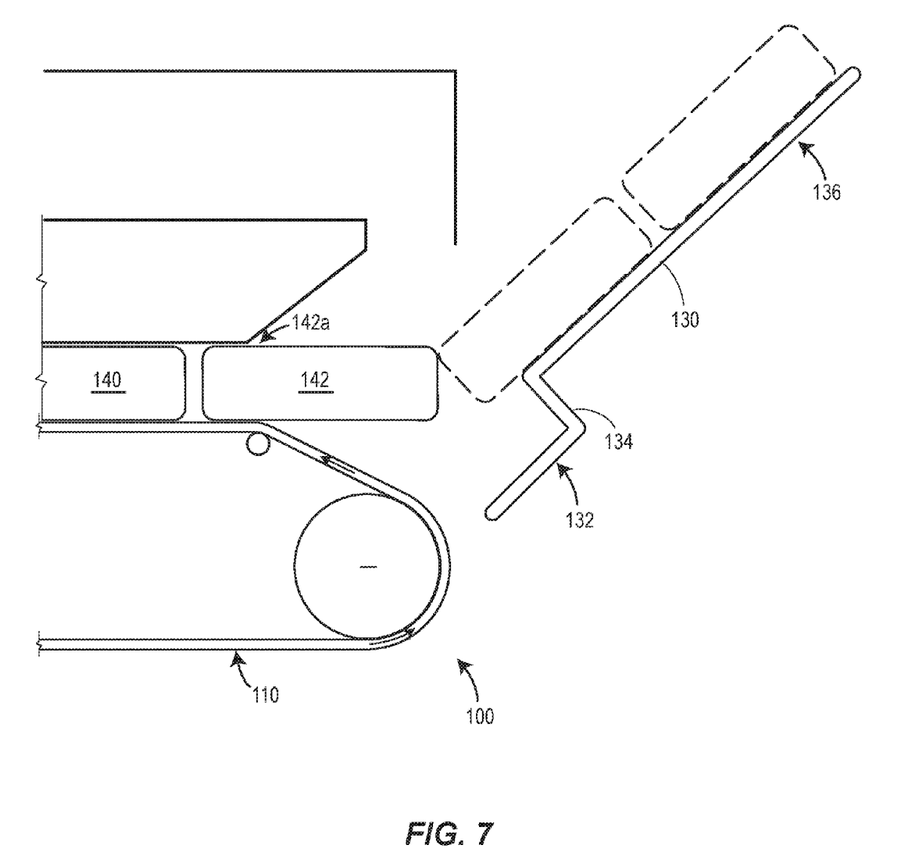

As illustrated in FIG. 6, the second food product 142 has advanced so that the trailing portion 142b thereof contacts and is engaged by the conveyor belt system 110, and as seen in FIG. 7, the leading portion 142a then contacts the heating unit 120 and advances along the heating cavity 104, allowing the food product 142 to be properly heated. As shown, the leading portion 142a of the second food product 142 only contacts the heating unit 120 after the trailing portion 142b of the second food product 142 has contacted and is supported by the conveyor belt system 110. Because the trailing portion 142b contacts the in-feed rack before the leading portion 142a of the second food product contacts the conveyor belt system 110, there is a delay in the leading portion 142a contacting the conveyor belt system 110, and the possibility of the second food product 142 being wedged or stuck under the first food product 140 is reduced, thus reducing the possibility of shingling or damaging the food product. So configured, the second or trailing bun cannot undermine the leading bun, which advantageously results in fewer buns being damaged or destroyed due to shingling.

As previously described, in some examples, the portion of the second food product 142 may alternatively pivot off of a side of the first food product 140

Turning to FIG. 8, an alternate heating device 800 is provided. It will be understood that the reference characters having the same two-digit suffixes (e.g., housing 802) as previously described reference characters (e.g., housing 102) represent similar elements and will not be discussed in substantial detail. In the alternate heating device 800, the in-feed rack 830 includes a first portion 832 having a longitudinal length positioned proximal to the conveyor belt system 810, a second portion 836 having a longitudinal length, the second portion being adjacent to the first portion, and a third portion 838 having a longitudinal length, the third portion being adjacent to the second portion. As previously described, an offset 834 (denoted by "y") is positioned between the first and second portions 832, 836. A second offset 837 is positioned between the second and third portions 836, 838. This offset 837 causes the longitudinal length of the second portion 836 to be offset a distance (denoted by "y'") from the longitudinal length of the third portion 838.

The second offset 837 may be useful to further enhance the likelihood of leading portions of trailing food products to remain above and/or supported by trailing portions of leading food products, to thereby further reduce the possibility of shingling and/or other damage to the food products. It will be understood that the distance y' may be greater, less than, or equal to the height of the offset 834 (denoted by "y"), which generally corresponds and can have the dimensions provided above with respect to offset 134. Generally, the offset 837 has a height less than the thickness of a food product to be heated by the heating unit as described above with respect to offset 134. Heights greater than the thickness of the food product to be heated can detrimentally cause undesirable overlap of more than two food items.

Further, it is understood that any number of additional offsets and longitudinal portions may be used.

A vertical feed rack structure having vertically stacked food items contained therein (which are well known in the art) can be coupled to and thus used to feed the offset in feed rack 130, 830.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A heating system for heating a food product comprising:
    a housing including at least one heating cavity;
    a conveyor belt system configured to move the food product from a first end of the heating cavity to a second end of the heating cavity, the conveyor belt system comprising a substantially horizontal portion having a generally planar cross section and an angled portion having a generally planar cross section, the angled portion oriented at a downwardly inclined angle relative to the substantially horizontal portion, wherein the angled portion facilitates receiving the food product;
    a heating unit disposed generally parallel to a top surface of the conveyor belt system;
    a gravity-fed in-feed rack having a first portion positioned proximal to the conveyor belt system and a second portion positioned distal to the conveyor belt system and being disposed at a height that is above a height of the first portion, the first portion having a first end disposed adjacent to the angled portion of the conveyor belt system and a second end disposed adjacent to the second portion of the gravity-fed in-feed rack, the first portion and the second portion each having a generally planar cross section;
    wherein a longitudinal length of the first portion of the in-feed rack is offset a substantially vertical distance from a longitudinal length of the second portion of the in-feed rack, and wherein the first end of the first portion of the gravity-fed in-feed rack is disposed below a plane formed by the substantially horizontal portion of the conveyor belt system, the gravity-fed in-feed rack and the conveyor belt system being configured to facilitate movement of the food product from the second portion of the in-feed rack to the angled portion of the conveyor belt system prior to the food product contacting the first portion of the in-feed rack.

2. The heating system of claim 1, wherein the longitudinal length of the first portion is less than a length of the at least one food product to be heated by the heating unit.

3. The heating system of claim 1, wherein the first portion of the in-feed rack and the second portion of the in-feed rack are configured in a substantially stepped pattern.

4. The heating system of claim 1, wherein the in-feed rack is configured to facilitate movement of a trailing food product from the second portion of the in-feed rack to the first portion of the in-feed rack prior to the food product contacting the conveyor belt system.

5. The heating system of claim 1, wherein the in-feed rack is configured to cause a generally trailing portion of the food product to contact the in-feed rack prior to a generally leading portion of the food product contacting the conveyor belt system.

6. The heating system of claim 1, wherein the offset between the longitudinal length of the first portion of the in-feed rack and the longitudinal length of the second portion of the in-feed rack has a height less than a thickness of the food product.

7. The heating system of claim 1, wherein the heating unit comprises a heating platen configured to heat the food product via contacting a surface of the food product to apply heat thereto.

8. The heating system of claim 1, wherein the substantially vertical distance between the longitudinal length of the first portion of the in-feed rack and the longitudinal length of the second portion of the in-feed rack is a sufficient length such that an upper surface of a trailing food product remains above or level with an upper surface of a leading food product.

9. The heating system of claim 8, wherein the in-feed rack is configured to cause a leading portion of the trailing food product to contact the leading food product at a contact point and pivot about the contact point until a trailing portion of the trailing food product contacts at least one of the first portion of the in-feed rack and the conveyor belt system.

10. The heating system of claim 1, wherein the longitudinal length of the first portion of the in-feed rack and the longitudinal length of the second portion of the in-feed rack are substantially parallel.

11. The heating system of claim 1, wherein the longitudinal length of the first portion of the in-feed rack and the longitudinal length of the second portion of the in-feed rack are on intersecting planes.

12. The heating system of claim 1, wherein the first portion of the in-feed rack is positioned approximately the length of a food product away from the heating cavity.

13. The heating system of claim 1, wherein the offset between the longitudinal length of the first portion of the in-feed rack and the longitudinal length of the second portion of the in-feed rack is defined by an offset axis, wherein the height of the offset axis is less than the thickness of the food product.

14. The heating system of claim 1, wherein the offset between the longitudinal length of the first portion of the in-feed rack and the longitudinal length of the second portion of the in-feed rack is adjustable.

* * * * *